United States Patent [19]

Nasyrov et al.

[11] 3,876,386

[45] Apr. 8, 1975

[54] METHOD OF PRODUCING VANADIUM SLUDGE

[76] Inventors: Gakif Zakirovich Nasyrov, prospekt Nauki 12, kv. 49; Izabella Vladislavovno Ravdonikas, ulitsa 111 Internatsionala 14, kv. 58, both of Leningrad, U.S.S.R.

[22] Filed: Dec. 11, 1973

[21] Appl. No.: 423,747

[52] U.S. Cl. .................. 23/295; 23/296; 23/301; 423/65
[51] Int. Cl. ........................ B01d 9/00; B01j 17/00
[58] Field of Search ........ 23/295, 296, 305; 423/62, 423/65, 120, 121, 592, 593, 625

[56] References Cited
UNITED STATES PATENTS
3,712,942  1/1973  Svejda ............................... 423/65

Primary Examiner—A. Louis Monacell
Assistant Examiner—D. Sanders
Attorney, Agent, or Firm—Holman & Stern

[57] ABSTRACT

The present invention relates to methods of producing vanadium sludge in the production of alumina contemplating processing of alunites and bauxites into such final products as alumina and potassium sulphate.

The method of producing vanadium sludge comprises crystallization of vanadium sludge from a process liquor resulting from treating the starting stock of the alumina production with a solution of caustic alkalis upon cooling said liquor to a temperature ranging from 20° to 30°C.

A distinctive feature of the method of the present invention resides in maintaining the process liquor, during the cooling thereof, at a temperature of from 40° to 65°C for a certain period of time.

The method of the present invention features an advantage residing in the separation of harmful impurities in the form of an intermediate precipitate, which separation occurs during said period of maintaining the process liquor at the intermediate temperature. This makes it possible to substantially reduce the amount of harmful impurities in the vanadium sludge and improve the quality thereof as well as to facilitate further treatment of the sludge.

3 Claims, No Drawings

METHOD OF PRODUCING VANADIUM SLUDGE

BACKGROUND OF THE INVENTION

The present invention relates to the production of alumina and, more specifically, to methods of producing vanadium sludge in the production of alumina, namely in the processing of alunites and bauxites into alumina and other products.

It is known that vanadium sludge in alumina production serves as a source for obtaining vanadium pentoxide which may be used as such or may be processed into metallic vanadium, vanadium ligature, and the like.

Known in the art are some methods of producing vanadium sludge from process liquors of alumina production. (The term "process liquor" as used throughout the present specification means a liquor which results from treating the starting stock of the alumina production process with a solution of caustic alkalis and is subjected to transformations at further stages of the alumina production process).

Among said prior-art methods mostly used is a method of producing vanadium sludge by crystallization from a process liquor of the alumina production upon cooling thereof. The cooling is effected gradually from a temperature such as generally used in technological processes of alumina production to a temperature of 20° to 30°C, at which temperature the process liquor is maintained for a certain period of time to ensure a more complete passing of sodium vanadate from the liquor into a residue. Thereafter, the resulting residue of vanadium sludge is separated from the liquor by settling, followed by centrifugation, filtration and by other conventional techniques.

The main disadvantage of this prior-art method resides in the presence of a considerable amount of harmful impurities such as sodium and potassium sulphates, sodium carbonate, sodium and potassium aluminates, sodium fluoride, sodium arsenate, reduced sulphur compounds, sodium alumosilicate and the like in the vanadium sludge. (In alumina production from bauxites the process liquor may not contain some of the above-mentioned salts, for example: potassium and sodium sulphates, potassium aluminate, reduced sulphur compounds. Vanadium sludge produced by crystallization of process liquors upon cooling thereof to a temperature of 20° to 30°C is also free from these salts).

Therewith, the total amount of impurities may be as high as 90 percent by weight of the vanadium sludge.

For instance, in the production of alumina from an alunite ore consisting of 50 percent barren rock and 50 percent of alunite mineral having the chemical formula: $(K,Na)_2SO_4.Al_2(SO_4)_3.2Al_2O_3.6H_2O$ vanadium sludge is recovered by a conventional method such as crystallization upon gradual cooling of the evaporated process liquor to 25°C. This vanadium sludge has the following composition, per cent by weight:

| | |
|---|---|
| $V_2O_5$ | 1.5 |
| $P_2O_5$ | 1.3 |
| $SO_3$ | 36.0 |
| $Na_2O$ | 21.3 |
| $K_2O$ | 29.4 |
| $Al_2O_3$ | 4.3 |
| $SiO_2$ | 0.6 |
| other - the balance. | |

In the production of alumina from a hydrargillite-type bauxite with a high silicon content and with 8.4 percent of $SiO_2$ and 45.9 percent of $Al_2O_3$, vanadium sludge is prepared by a conventional method such as crystallization of the process liquor upon cooling thereof. This vanadium sludge has the following chemical composition, per cent by weight:

| | |
|---|---|
| $V_2O_5$ | 9.8 |
| $P_2O_5$ | 4.0 |
| $Na_2O$ | 30 |
| $K_2O$ | 0.5 |
| $Al_2O_3$ | 1.2 |
| $SO_3$ | 0.2 |
| F | 2.5 |
| $H_2O$ | 40.0 |
| other - the balance. | |

Even minor amounts of the impurities make further processing of the vanadium sludge more expensive and complicated. In particular, they necessitate additional operations of purification resulting in the formation of residues which are difficult to filter. Moreover, the impurities are responsible for greater losses of vanadium with the waste liquors and residues. As the amount of impurities increases, the greater are the losses of vanadium. The impurities also add to the cost of reagents for purification or elimination of the detrimental effect produced by the impurities.

Another disadvantage of said prior-art method resides in the fact that a great amount of impurities such as potassium and sodium sulphates and sodium carbonate in the vanadium sludge necessitates the use of vanadate solutions of a low concentration which, consequently, leads to increased rates of solutions involved in the technological process of further treatment of vanadium sludge. This, in turn, results in increased energy consumption for heating, cooling, pumping and other operations performed with additional amounts of the solutions.

Also known in the art are methods of producing vanadium sludge from process liquors of the alumina production by way of electrochemical deposition of vanadium compounds; by precipitation of vanadium with calcium compounds; by precipitation of vanadium compounds from solutions resulting from liquid extraction or ion exchange. These methods are more complicated and in many cases practically inefficient from an economical standpoint as compared with the method of crystallizing vanadium sludge from process liquors by cooling thereof.

Furthermore, these prior-art methods fail to give the final product, viz. vanadium sludge, always of a good quality; in particular, vanadium in the sludge may be represented by sparingly soluble compounds; additionally, the sludge may be substantially contaminated with aluminium compounds and other impurities, while in the vanadium sludge produced by crystallization the content of said impurities is considerably reduced.

SUMMARY OF THE INVENTION

It is the main object of the present invention to provide a method of producing vanadium sludge in alumina production which would ensure the most favorable conditions for crystallization of vanadium sludge from the process liquor, and more particularly, best conditions for cooling the liquor, which is essential for the entire crystallization process.

Other practical objects of the present invention are to minimize the amount of such harmful impurities as potassium and sodium sulphates, sodium carbonate, potassium and sodium aluminates and the like, and, consequently, to make the technology of further processing of vanadium sludge simpler and less expensive due to the elimination of operations of purifying the sludge from impurities; to reduce vanadium losses with waste liquors and residues by decreasing the number of treatments of process liquors due to a reduced amount of harmful impurities in the sludge; to lower energy consumption by decreasing the number of technological streams. An important object of the present invention is to improve the quality of the final product, viz. vanadium sludge, by avoiding the presence of sparingly soluble vanadium compounds in the sludge.

These objects are accomplished in the production of vanadium sludge by crystallization of the sludge from the process liquor resulting from the treatment of the starting stock of the alumina production with a solution of caustic alkalis upon cooling the liquor to a temperature of 20° to 30°C, followed by separation of the resulting vanadium sludge residue from the liquor. According to the present invention, the liquor resulting from the treatment of the starting stock with the solution of caustic alkalis and containing vanadium salts is maintained, during cooling thereof, at a temperature ranging from 40° to 65°C until the formation of an intermediate residue which is then separated from the liquor.

This makes it possible to separate a considerable portion of harmful impurities, as an intermediate residue, from the vanadium-containing liquor prior to the moment of crystallization of the sludge per se and to reduce thereby, to the maximal possible extent, the content of harmful impurities therein.

It is advisable, after maintaining the process liquor at a temperature of 40° to 65°C and separating the intermediate residue, to dilute the liquor in order to ensure better solubility, in the process liquor, of such salts as potassium and sodium sulphates, sodium carbonate and the like, i.e. make the process liquor unsaturated with these salts at a temperature of 20° to 30°C at which temperature the crystallization of vanadium sludge takes place in order to maintain these salts in a dissolved state so that sodium vanadate and other salts which are impossible to prevent from precipitating at a temperature of 20° to 30°C such as sodium fluoride and phosphate may pass into the vanadium sludge residue. More specifically, the process liquor should be maintained at a temperature from 40° to 65°C for at least 30 minutes.

DETAILED DESCRIPTION OF THE PREFERRED EMBODIMENT

The present invention will become more fully apparent from the following description of a specific embodiment thereof illustrated by Examples showing how the method of the present invention may be performed.

The method for the present invention is equally useful for the production of vanadium sludge from alunites and bauxites of such compositions which are generally used in conventional methods of producing vanadium sludge in alumina production. It is known that the alunites and bauxites should contain vanadium compounds capable of passing into process liquors and being accumulated therein.

For the production of vanadium sludge the process liquor may be taken from any stage of the alumina production. It is most preferred to employ the process liquor after evaporation thereof, since it is enriched, to a greater extent, with sodium vanadate and has the highest concentration of caustic $Na_2O$ which contributes to the fullest separation of such salts as potassium and sodium sulphates and the like from the process liquor upon maintaining this liquor at a temperature from 40° to 65°C.

The process liquor at each stage of the alumina production has a rather specific composition which depends on the starting alumina-stock composition and a method of treating thereof. For example, the concentration of caustic $Na_2O$ in the process liquor after evaporation may vary, due to the abovesaid reasons, within the range of 150 and 300 g/l, while the sodium vanadate concentration may vary from 0.4 to 3.5 g/l as calculated for $V_2O_5$.

Vanadium sludge is produced by a stepwise cooling of the process liquor, the latter being maintained at a temperature within the range of 40° and 65°C.

It is advisable to maintain the process liquor at this temperature for a period of at least 30 minutes. At a shorter time there occurs an insufficient precipitation of potassium and sodium sulphates, sodium carbonate and the like. A longer duration over 10 hours does not have any influence upon the degree of precipitation of the above-mentioned salts but may have a practical importance for aggregation of crystals of the salts in the precipitate to facilitate subsequent separation of the precipitate from the process liquor.

As a result of maintaining the liquor at a temperature of 40° to 65°C an intermediate precipitate is formed containing mainly harmful impurities such as potassium and sodium sulphates, sodium carbonate, sodium fluoride and the like. The remaining liquor contains mainly caustic alkalis, potassium and sodium aluminates as well as non-precipitated potassium and sodium sulphates, sodium carbonate, sodium fluoride, sodium phosphate and alumosilicate, and the like. (In the alumina production from bauxites said liquor may be free from potassium and sodium sulphates as well as other potassium salts). All of the sodium vanadate practically remains in the liquor.

After maintaining the process liquor at a temperature of 40° to 65°C and separating the resulting precipitate from the liquor, the latter is further cooled to a temperature of 20°–30°C and maintained at this temperature to more completely crystallize vanadium sludge from the liquor. The resulting precipitate of vanadium sludge is separated from the liquor.

It is advisable to dilute the liquor prior to further cooling thereof a temperature within the range of from 40° and 65°C to a temperature ranging from 20° to 30°C.

Lower concentrations of caustic alkalis in the process liquor due to the dilution thereof contribute to a better solubility of such salts contained in the liquor as potassium and sodium sulphates, sodium carbonate, sodium fluoride and the like. As a consequence, these salts will not be precipitated along with sodium vanadate and phosphate during the crystallization process at a temperature of 20° to 30°C or will be precipitated in insignificant amounts substantially smaller than those obtained upon crystallization of vanadium sludge from undiluted liquors.

EXAMPLE 1

For the production of vanadium sludge use was made of an evaporated process liquor resulting from processing a hydrargillite-type bauxite with a high silicon content and with 8.4% of $SiO_2$ and 45.9% of $Al_2O_3$ such as used in the alumina production. The evaporated process liquor had the following composition, g/l:

| | |
|---|---|
| $Al_2O_3$ | 127.20 |
| caustic $Na_2O$ | 279.00 |
| carbonate $Na_2O$ | 28.90 |
| $SO_3$ | 3.68 |
| $V_2O_5$ | 1.05 |
| $P_2O_5$ | 0.73 |

The liquor was cooled from a temperature of 90°C to 65°C and maintained at this temperature for two hours while stirring. An intermediate residue was thus formed consisting mainly of sodium carbonate and containing, in addition thereto, 4.5 percent of NaF, 16.5 percent of $Na_2SO_4$ and minor amounts of sodium aluminate, caustic soda, sodium arsenate, sodium alumosilicate, and the like. The residue was separated from the liquor by filtration. The resulting liquor was diluted with washing water from aluminium hydroxide containing mainly a caustic alkali in an amount of 26 g/l as calculated for caustic $Na_2O$, sodium aluminate in an amount of 11 g/l as calculated for $Al_2O_3$, and sodium carbonate in an amount of 4.1 g/l as calculated for carbonate $Na_2O$. The process liquor, after the dilution, contained the following amounts of the principal components, g/l:

| | |
|---|---|
| $Al_2O_3$ | 77.0 |
| caustic $Na_2O$ | 170.0 |
| carbonate $Na_2O$ | 18.0 |

The process liquor after the dilution was cooled to a temperature of 20°C and maintained at this temperature for 6 hours while stirring until crystallization of vanadium sludge from the liquor. The resulting precipitate of the vanadium sludge was separated from the liquor by filtration and the filter cake was washed with cold water at a rate of 0.3 l of water per kg of dry sludge.

After the crystallization of vanadium sludge the process liquor had the following composition, g/l:

| | | | |
|---|---|---|---|
| $Al_2O_3$ | 77.2 | $SO_3$ | 1.75 |
| caustic $Na_2O$ | 170.5 | $V_2O_5$ | 0.22 |
| carbonate $Na_2O$ | 18.0 | $P_2O_5$ | 0.16 |

The resulting vanadium sludge had the following composition expressed in per cent by weight:

| | |
|---|---|
| $V_2O_5$ | 22.4 |
| $P_2O_5$ | 9.3 |
| $Na_2O$ | 38.5 |
| $K_2O$ | 0.1 |
| $Al_2O_3$ | 0.3 |
| $SO_3$ | 0.07 |
| F | 1.5 |
| $H_2O$ | 27.4 |
| other - the balance. | |

EXAMPLE 2

For the production of vanadium sludge use was made of an evaporated process liquor resulting from processing, into alumimina, an alunite ore consisting of 50 percent of barren rock and 50 percent of alunite mineral with the chemical formula: $(K, Na_2SO_4 \cdot Al_2(SO_4)_3 \cdot 2Al_2O_3 \cdot 6H_2O)$.

The evaporated process liquor had the following composition, g/l:

| | |
|---|---|
| $Al_2O_3$ | 124.1 |
| caustic $Na_2O$ | 260.6 |
| carbonate $Na_2O$ | 2.1 |
| $SO_3$ | 5.2 |
| $V_2O_5$ | 2.57 |
| $P_2O_5$ | 5.40 |

The ratio of potassium oxide concentration to the total concentration of alkali oxides was 40 mol.%.

The liquor was cooled from 75°C to a temperature of 50°C and maintained at this temperature for one hour while stirring.

The resulting precipitate was separated from the liquor by filtration. The precipitate consisted of 95% glaserite (3 $K_2SO_4 \cdot Na_2SO_4$) and potassium sulphate, and contained, in addition to these salts, minor amounts of sodium fluoride, sodium alumosilicate, caustic alkalis, sodium aluminate, reduced sulphur compounds, and the like.

The resulting liquor was diluted with water. The process liquor contained, after the dilution, the following amounts of the principal components, g/l:

| | |
|---|---|
| $Al_2O_3$ | 90.2 |
| $Na_2O$ caustic | 189.5 |

After dilution, the process liquor was cooled to a temperature of 25°C and maintained at this temperature for 12 hours.

The resulting vanadium sludge precipitate was separated from the liquor by filtration and the filter cake was washed with cold water at a rate of 0.3 l per kg of the sludge.

The process liquor after crystallization of the vanadium sludge had the following composition, g/l:

| | |
|---|---|
| $Al_2O_3$ | 90.3 |
| caustic $Na_2O$ | 189.8 |
| carbonate $Na_2O$ | 1.5 |
| $SO_3$ | 2.6 |
| $V_2O_5$ | 0.54 |
| $P_2O_5$ | 0.36 |

The resulting sludge had the following composition, per cent by weight:

| | |
|---|---|
| $V_2O_5$ | 9.40 |
| $P_2O_5$ | 24.6 |
| $Na_2O$ | 41.8 |
| $K_2O$ | 0.1 |
| $SO_3$ | 0.2 |
| $Al_2O_3$ | 0.2 |
| $SiO_2$ | 0.3 |
| $H_2O$ | 22.9 |
| other - the balance. | |

EXAMPLE 3

For the production of vanadium sludge use was made of an evaporated process liquor resulting from processing, into alumina, an alunite ore consisting of 50 percent of barren rock and 50 percent of alunite mineral with the chemical formula: $(K,Na)_2SO_4 \cdot Al_2(SO_4)_3 \cdot 2Al_2O_3 \cdot 6H_2O$.

The evaporated process liquor had the following composition, g/l:

|  |  |
|---|---|
| $Al_2O_3$ | 69.0 |
| caustic $Na_2O$ | 151.3 |
| carbonate $Na_2O$ | 0.9 |
| $SO_3$ | 36.6 |
| $V_2O_5$ | 1.62 |
| $P_2O_5$ | 3.90 |

The ratio of potassium oxide concentration in the liquor to the total amount of alkali oxides was 22 molar percent.

The liquor was cooled from 75°C to a temperature of 45°C for 2 hours while stirring. The resulting precipitate was separated from the liquor by filtration. The filter cake consisted of 95% of glaserite ($3K_2SO_4 \cdot Na_2SO_4$) and sodium sulphate and contained, in addition to these salts, minor amounts of sodium fluoride, sodium alumosilicate, caustic alkalis, sodium aluminate, reduced sulphur compounds, and the like.

The resulting liquor was diluted with water. The process liquor contained the following amounts of the principal components after the dilution, g/l:

|  |  |
|---|---|
| $Al_2O_3$ | 64.1 |
| caustic $Na_2O$ | 140.8 |
| $SO_3$ | 21.7 |

The process liquor was cooled, after the dilution, to a temperature of 20°C and maintained at this temperature for a period of 10 hours. The resulting precipitate of vanadium sludge was separated from the liquor by filtration and the filter cake was washed with cold water at a rate of 0.3 l per 1 kg of the sludge.

After crystallization of the vanadium sludge, the process liquor had the following composition, g/l:

|  |  |
|---|---|
| $Al_2O_3$ | 64.1 |
| $Na_2O$ caustic | 140.9 |
| $Na_2O$ carbonate | 0.77 |
| $SO_3$ | 21.7 |
| $V_2O_5$ | 1.01 |
| $P_2O_5$ | 2.10 |

The vanadium sludge thus obtained had the following composition, per cent by weight:

|  |  |
|---|---|
| $V_2O_5$ | 8.1 |
| $P_2O_5$ | 23.4 |
| $Na_2O$ | 39.6 |
| $K_2O$ | 0.1 |
| $SO_3$ | 0.2 |
| $Al_2O_3$ | 0.3 |
| $SiO_2$ | 0.2 |
| $H_2O$ | 24.5 |
| other - the balance. |  |

What is claimed is:

1. A method of producing vanadium sludge comprising the steps of: cooling a process liquor resulting from treating a starting stock of an alumina production process with a solution of caustic alkalis at a temperature within the range of 40° to 65°C; maintaining the process liquor at this temperature until a precipitate is formed; separating said precipitate from the liquor; further cooling the liquor, after separation of said precipitate, to a temperature of 20° to 30°C until another precipitate is formed; and separating the latter precipitate comprising substantially vanadium sludge from the liquor.

2. The method as claimed in claim 1, further comprising the step of diluting the process liquor after separating the precipitate resulting from maintaining the process liquor at a temperature within the range of 40° to 65°C.

3. The method as claimed in claim 1, wherein the process liquor is maintained at a temperature within the range of 40° to 65°C for a period of at least 30 minutes.

* * * * *